United States Patent [19]

Omura et al.

[11] Patent Number: 4,833,929
[45] Date of Patent: May 30, 1989

[54] FORCE TRANSDUCER

[75] Inventors: Yoshiteru Omura; Kazuyoshi Kawaguchi; Kouji Tsukada; Susumu Sugiyama; Sadayuki Hayashi; Masayuki Matsui, all of Aichi, Japan

[73] Assignee: Kabushiki Kaisha Toyota Chuo Kenkyusho, Aichi, Japan

[21] Appl. No.: 224,764

[22] Filed: Jul. 27, 1988

[30] Foreign Application Priority Data

Jul. 31, 1987 [JP] Japan .................................. 62-190409

[51] Int. Cl.$^4$ ........................ G01L 1/18; H01C 10/10
[52] U.S. Cl. ..................................... 73/862.68; 388/5
[58] Field of Search ............... 73/777, 862.68, 766; 338/2, 5, 47

[56] References Cited

U.S. PATENT DOCUMENTS

| | | | |
|---|---|---|---|
| 3,145,563 | 8/1964 | Hollander, Jr. | 73/862.08 |
| 3,149,488 | 9/1964 | Castro | 73/862.68 |
| 3,251,222 | 5/1966 | Fenner | 338/2 X |
| 4,406,992 | 9/1983 | Kurtz et al. | 338/2 |

OTHER PUBLICATIONS

Journal of Applied Physics, vol. 32, No. 10, Oct. 1961, pp. 2008–2019, W. G. Peann et al., "Semiconducting Stress Transducers . . .".

Primary Examiner—Charles A. Ruehl
Attorney, Agent, or Firm—Oblon, Fisher, Spivak, McClelland & Maier

[57] ABSTRACT

A force transducer for detecting compression. The force transducer comprises an Si single crystal so formed as to have a crystal face of {110} as the surface to which compression is applied; a first pair of opposing electrodes provided on the Si single crystal in the direction having an angle of 45 degrees with the direction of <001> of the Si single crystal and a second pair of opposing electrodes provided on the Si single crystal in the direction having an angle of 45 degrees with the direction of <110> of the Si single crystal; a seat which is bonded to the crystal face of {110} of the Si single crystal and which transmits the compression substantially uniformly to the crystal face; and a base which is bonded to the surface of the Si single crystal opposite to the surface bonded with the seat and which supports the Si single crystal. The force transducer has a simple structure as a whole and is capable of detecting compression with accuracy.

18 Claims, 6 Drawing Sheets

10a: AREA A $\sigma_z = \dfrac{W}{A}$

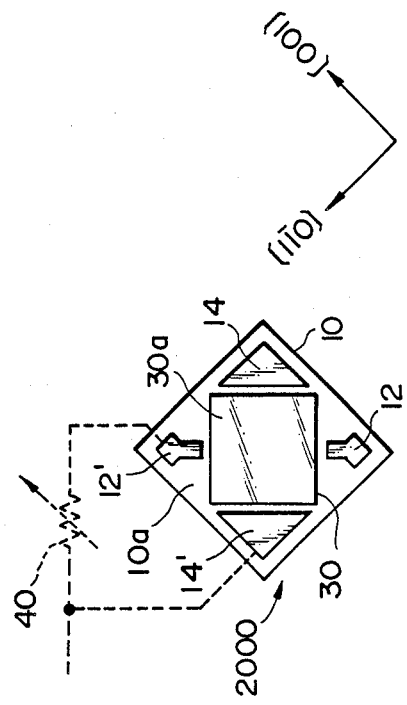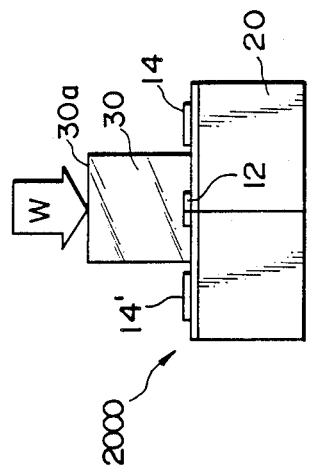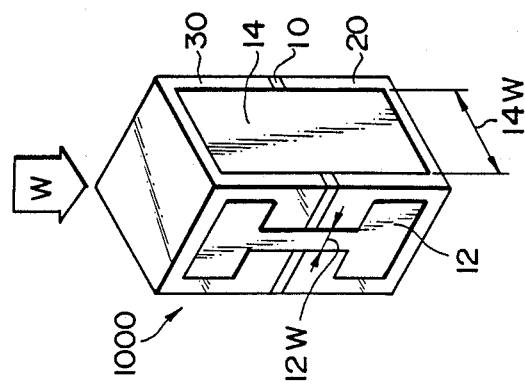

FORCE TRANSDUCER

BACKGROUND OF THE INVENTION

1. Field of the Invention

The present invention relates to a force transducer for detecting compression such as a compression type load cell.

2. Description of the Related Art

A compression type load cell, which is typical of conventional force transducers, is so designed that the strain which generates in correspondence with the compression applied to a strain generator is generally transmitted to a plurality of strain gages which are pasted to the strain generator by an adhesive and electrically connected with each other in such a manner as to constitute a Wheatstone bridge circuit, and is detected as the magnitude of a voltage output which is generated in correspondence with a change in the resistance of the strain gages. As the strain gage used in such a load cell, a semiconductor strain gage made of a single crystal of a semiconductor represented by Si has recently become predominant.

FIG. 2 is a perspective view of a conventional compression type load cell which is composed of a plurality of semiconductor strain gages pasted to a strain generator by an adhesive. In FIG. 2, the reference numeral 110 represents a semiconductor strain gage pasted on the side surface 150a of a strain generator 150 by an adhesive 160 in the direction of X in which the compression W applied to the strain generator 150 acts. The reference numeral 120 represents a semiconductor strain gage pasted in the direction of Y which is the direction orthogonal to the direction of X in which the semiconductor strain gage 110 is pasted. Semiconductor gages (not shown) are also pasted on the opposite side of the side surface 150a in the same manner as the semiconductor strain gages 110 and 120. These semiconductor strain gages are connected with each other in such a manner as to constitute a Wheatstone bridge circuit in order to reduce the deleterious influence of a change in the resistance caused by a change in the temperature on the characteristics.

In the compression type load cell shown in FIG. 2, when the compression W is applied to the top surface 150b of the strain generator 150, a compression strain caused by a compression stress $\sigma_x$ which works in the direction of X through the adhesive 160 acts on the semiconductor strain gage 110, and on the semiconductor strain gage 120 the elongation strain in the direction of Y acts through the adhesive 160 in accordance with the Poisson ratio $\nu$. Thus, a change of resistance is brought about due to the piezoresistive effect.

In FIG. 3, the semiconductor strain gage 110 is enlarged in order to explain the change of resistance in the semiconductor strain gage 110 in the conventional compression type load cell shown in FIG. 2. In FIG. 3, the reference numerals 111 and 111' represent a pair of opposing output electrodes provided on the crystal face 110a of the semiconductor strain gage 110 in the direction of X in which the compression W works. The reference numerals 112 and 112' represent a pair of opposing input electrodes. In FIG. 3, the output electrodes 111, 111' also serve as the input electrodes 112, 112'.

In the semiconductor strain gage 110 shown in FIG. 3, the compression stress $\sigma_x$ which is called perpendicular stress is generated by the strain of the strain generator when the compression W is applied to the strain generator 150, whereby the semiconductor strain gage 110 causes a change of resistance $\Delta R/R$ represented by the formula (1) due to the piezoresistive effect.

$$\Delta R/R = \pi_{11'} \cdot \sigma_x \qquad (1)$$

In the formula (1), $\pi_{11'}$ represents a piezoresistive coefficient of the semiconductor strain gage 110 which is provided with the output electrodes 111, 111' and the input electrodes 112, 112' and to which the compression W is applied in the direction of X such that the compression stress $\sigma_x$ is generated in the direction of X, as shown in FIG. 3. A semiconductor strain gage is generally so designed as to have the piezoresistive coefficient $\pi_{11'}$ at its maximum under the above-described condition. For example, a semiconductor strain gage consisting of a p-type Si single crystal is so designed that the direction of X is the direction of $<111>$. A semiconductor strain gage consisting of an n-type Si single crystal is so designed that the direction of X is the direction of $<100>$.

As described above, a conventional force transducer is composed of a plurality of semiconductor strain gages shown in FIG. 3 pasted to a strain generator by an adhesive and connected with each others in such a manner as to constitute a Wheatstone bridge circuit. A compression type load cell which is typical of such a force transducer has the following problems, but no compression type load cell incorporating a novel system for detecting compression has been known for several years.

Problem 1

In the conventional compression type load cell, a plurality of semiconductor strain gages are pasted to the strain generator and connected in such a manner as to constitute a Wheatstone bridge circuit in order to reduce the deleterious influence of a change in the resistance caused by a change in the temperature of the semiconductor strain gages on the characteristics and to take out the voltage output which is generated in correspondence with the applied compression. Since the operation for pasting a plurality of semiconductor strain gages to the strain generator and forming a Wheatstone bridge requires complicated and high technique, there is nonuniformity in the characteristics of the compression type load cells produced and the manufacturing cost is disadvantageously high.

Problem 2

In the conventional compression type load cell, the adhesive which is unfavorable in the respect of the characteristics is used for pasting the semiconductor strain gages to the strain generator. More specifically, although the adhesive has a function of transmitting the strain of the strain generator to the semiconductor strain gage with certainty, the adhesive induces deleterious influence such as creep and hysteresis and further produces a problem of incapability of transmitting the strain of the strain generator to the semiconductor strain gage with certainty, thereby greatly lowering the reliability of the compression type load cell.

SUMMARY OF THE INVENTION

Accordingly, it is an object of the present invention to eliminate the above-described problems in the related art and to provide a force transducer in which the change in the characteristics due to a change in temperature is small, which has such a simple structure to be produced easily and which has a high reliability.

To achieve this aim, the present invention provides a force transducer comprising: an Si single crystal so formed as to have a crystal face of {110} as the surface to which compression is applied; a plurality of electrodes which consist of a first pair of opposing electrodes provided on said Si single crystal in the direction having an angle of 45 degrees with the direction of <001> of the Si single crystal and a second pair of opposing electrodes provided on the Si single crystal in the direction having an angle of 45 degrees with the direction of <110> of the Si single crystal, either of the first or second pair of electrodes being output electrodes and the other pair being input electrodes; a seat which is bonded to the crystal face {110} of said Si single crystal and which transmits said compression substantially uniformly to the crystal face; and a base which is bonded to the surface of the Si single crystal opposite to the surface bonded with the seat and which supports the Si single crystal.

Measures for overcoming the above-described problems so as to lead to the present invention will be described in the following.

Measure 1

In order to reduce the deleterious influence of a change in the resistance caused by a change in the temperature of the semiconductor strain gages on the characteristics, one Si single crystal is used in the present invention in place of the semiconductor strain gages which are pasted to the strain generator and connected in such a manner as to constitute a Wheatstone bridge circuit in the related art.

For this purpose, a pair of opposing output electrodes and a pair of opposing input electrodes are provided on one Si single crystal in such a manner as to intersect each other, preferably such as to be orthogonal to each other.

FIG. 4 explains Measure 1 in detail. In FIG. 4, the reference numeral 10 represents an Si single crystal which is cut in such a manner as to have a rectangular (or square) crystal face 10a and which has uniform thickness and impurity concentration. The reference numerals 12 and 12' represent a pair of opposing output electrodes provided on the center line X of the Si single crystal 10 at the positions with an equal distance from the center line Y and with a space b therebetween. The reference numerals 14 and 14' represent a pair of opposing input electrodes provided on the center line Y at the positions with an equal distance from the center line X and with a space a therebetween.

By providing the output electrodes 12, 12' and the input electrodes 14, 14' on the Si single crystal 10 in this way, it is possible to make each of the resistances between 12 and 14, 14 and 12', 12' and 14', and 14' and 12 equal. In addition, since the thickness and the impurity concentration of the Si single crystal 10 are uniform, it is also possible to make each resistance which varies with a change in the temperature substantially equal.

Consequently, if a current is applied to the Si single crystal 10 from the input electrodes 14 and 14' and a voltage is taken out of the output electrodes 12 and 12', the offset voltage is maintained substantially at zero irrespective of a change of the temperature. In this way, according to the present invention, one Si single crystal which replaces a plurality of smiconductor strain gages in the related art solves Problem 1.

Measure 2

Even the use of one Si single crystal, however, leaves Problem 2 caused by the adhesive unsolved so long as compression is detected by the Si single crystal pasted to the strain generator as in the related art.

In the present invention, Problem 2 is solved by adopting to a force transducer a novel system for detecting compression by utilizing the piezoresistive effect of the Si single crystal based on the compression strain generated when compression is applied to the crystal face of the Si single crystal in the perpendicular direction thereto.

FIG. 5 is a perspective view of the Si single crystal 10 which explains the fundamental principle of the voltage output obtained by the Si single crystal 10 shown in FIG. 4. The Si single crystal 10 is bonded to the top surface 20a of a base 20. When the compression W is applied perpendicularly to the entire surface of the crystal surface 10a having an area A, the compression stress $\sigma_z$ (=W/A) is generated. In FIG. 5, the same numerals are provided for the elements which are the same as those in FIG. 4, and explanation thereof will be omitted.

The base 20 has a sufficient rigidity in the direction of Z in which the compression stress $\sigma_z$ is generated for being insusceptible to the stress or the like which obstructs the effective utilization of the piezoresistive coefficient $\pi_{63'}$ except the compression stress $\sigma_z$ generated on the Si single crystal 10 by the compression W applied to the base 20.

For the bonding between the base 20 and the Si single crystal 10, a means not using an adhesive which involves a fear of producing deleterious influence on the characteristics such as creep and hysteresis is preferably adopted. For example, the base 20 may be made of an insulating material and the Si single crystal 10 is bonded thereto by electrostatic bonding.

However, it goes without saying that the material of the base 20 is not restricted to an insulating material and that a conductive or semiconductive material may be used and the Si single crystal 10 may be bonded thereto by a means other than electrostatic bonding so long as the Si single crystal 10 is secured to the base 20 and no deleterious influence is produced on the current applied to the Si single crystal 10 and the voltage output taken out thereof.

By bonding the Si single crystal 10 to the base 20 in this way, it is possible to utilize the piezoresistive coefficient $\pi_{63'}$ effectively, because when the compression W is applied perpendicularly to the crystal face 10a of the Si single crystal 10, only the simple compression stress $\sigma_z$ is produced on the Si single crystal 10.

In the Si single crystal 10 in which a current flows to the Si single crystal 10 from the input electrodes 14 and 14' provided in the direction of Y and a voltage output $\Delta V$ is taken out of the output electrodes 12 and 12' provided in the direction of X with a space b therebetween, when the compression W is applied perpendicularly to the crystal face 10a, as shown in FIG. 5, the voltage output $\Delta V$ obtained by the Si single crystal 10 on which the compression stress $\sigma_z$ is produced is represented by the following formula (2):

$$\Delta V = b \cdot \rho \cdot J_2 \cdot \pi_{63'} \cdot \sigma_z \qquad (2)$$

In the formula (2), $\rho$ represents the resistivity of the Si single crystal 10, $J_2$ a current density, and $\pi_{63'}$ a piezoresistive coefficient.

Accordingly, in the Si single crystal 10 shown in FIG. 5, if the voltage output $\Delta V$ based on the piezoresistive coefficient $\pi_{63'}$ is sufficiently large for practical use, Problem 2 is solved.

The structure of a force transducer according to the present invention which has been achieved by adopting the above-described measures will now be explained.

A force transducer according to the present invention comprises:

an Si single crystal so formed as to have a crystal face of (110) as the surface to which compression is applied;

a plurality of electrodes which consist of a first pair of opposing electrodes provided on the Si single crystal in the direction having an angle of 45 degrees with the direction of [001] of the Si single crystal and a second pair of opposing electrodes provided on the Si single crystal in the direction having an angle of 45 degrees with the direction of [1$\bar{1}$0] of the Si single crystal, either of the first or second pair of electrodes being output electrodes and the other pair being input electrodes;

a seat which is bonded to the crystal face (110) of the Si single crystal and which transmits the compression substantially uniformly to the crystal face; and a base which is bonded to the surface of the Si single crystal opposite to the surface bonded with the seat and which supports the Si single crystal.

In one aspect of the present invention, at least either of the first or second pair of electrodes is disposed on a side surface of the Si single crystal (FIG. 4).

In another aspect of the present invention, at least either of the first or second pair of electrodes is disposed on the crystal surface (110) of the Si single crystal (FIG. 9).

The above-described structure will be explained in more detail with reference to the accompanying drawings.

In order to examine the relationship between the piezoresistive coefficient $\pi_{63'}$ which is essential for obtaining the voltage output $\Delta V$ in the Si single crystal 10 shown in FIG. 5 and the direction in which the output electrodes 12 and 12' are provided, the present inventors calculated the piezoresistive coefficient $\pi_{63'}$ of the four Si single crystals 10 having crystal faces (100), (110), (111) and (211), respectively, while changing the direction in which the output electrodes 12 and 12' are provided.

As a result, it has been found that in the case of (100), (111) and (211), the piezoresistive coefficient $\pi_{63'}$ becomes zero irrespective of the direction in which the output electrodes are provided, while in the case of (110), when the output electrodes are provided in the direction having an angle of 45 degrees with the direction of [001] or [1$\bar{1}$0], the piezoresistive coefficient $\pi_{63'}$ having the same absolute value and the maximum value exists.

FIG. 6 shows the results of the calculation of the piezoresistive coefficient $\pi_{63'}$ of a p-type Si single crystal having a crystal face of (110) and a resistivity of 7.8 $\Omega$—cm. It is clear that when the output electrodes are provided in the direction having an angle of 45 degrees with the direction of [001] or [1$\bar{1}$0], the maximum piezoresistive coefficient $\pi_{63'}$ exists.

Accordingly, it is possible to achieve the aim of the present invention, namely, to realize a force transducer which is cheap and highly reliable, by cutting the Si single crystal 10 bonded to the base 20 shown in FIG. 5 in such a manner as to have the crystal face 10$a$ of (110), providing it with the pair of opposing output electrodes 12 and 12' in the direction having an angle of 45 degrees with the direction of [001], and providing it with a later-described pressurizing means so as to constitute a novel system for detecting compression.

It is also possible to utilize the piezoresistive coefficient $\pi_{63'}$ in the same way and realize a force transducer in accordance with the present invention when the output electrodes is provided in the direction having an angle of 45 degrees with the direction of [1$\bar{1}$0] and the input electrodes in the direction having an angle of 45 degrees with the direction of [001]. The directions of [001] and [1$\bar{1}$0] are typical directions of crystallization an other directions of crystallization which are equivalent thereto may also be considered completely in the same way.

Table 1 shows the crystal faces equivalent to the crystal face of (110) and the directions of crystallization equivalent to the directions of [001] and [1$\bar{1}$0], respectively, of the Si single crystal. A crystal face equivalent to the crystal face of (110) is represented by {110} and the directions equivalent to the directions of [001] and [1$\bar{1}$0] are represented by <001> and <110>, respectively.

TABLE 1

| Crystal face | Direction of crystallization | Direction of crystallization |
|---|---|---|
| (110) | [001] | [1$\bar{1}$0] |
| ($\bar{1}\bar{1}$0) | [001] | [1$\bar{1}$0] |
| (1$\bar{1}$0) | [001] | [110] |
| ($\bar{1}$10) | [001] | [110] |
| (101) | [010] | [10$\bar{1}$] |
| ($\bar{1}$0$\bar{1}$) | [010] | [10$\bar{1}$] |
| (10$\bar{1}$) | [010] | [101] |
| ($\bar{1}$01) | [010] | [101] |
| (011) | [100] | [0$\bar{1}\bar{1}$] |
| (0$\bar{1}\bar{1}$) | [100] | [01$\bar{1}$] |
| (01$\bar{1}$) | [100] | [011] |
| (0$\bar{1}$1) | [100] | [011] |

In the Si single crystal 10 shown FIG. 5, the pair of output electrodes 12, 12' and the pair of input electrodes 14, 14' are provided on the side surfaces of the Si single crystal 10, but the positions for providing the electrodes are not restricted to the side surfaces, and there is no problem in disposing at least either pair of the output electrodes and the input electrodes on the crystal face 10$a$ in the region on which compression does not act.

Although the piezoresistive coefficient $\pi_{63'}$ of the p-type Si single crystal is shown in FIG. 6, it goes without saying that the piezoresistive coefficient $\pi_{63'}$ having a similar magnitude also exists in the n-type Si single crystal having the crystal face of (110), as shown in FIG. 7.

In addition, the piezoresistive coefficient $\pi_{63'}$ having a sufficient magnitude for practical use also exists in a p-type or n-type Ge single crystal having a crystal face of (110).

As is well known, an Si single crystal is a material having excellent mechanical strength and elastic region. However, if compression is concentrated on one point of the Si single crystal, it is naturally broken in spite of the excellent mechanical strength.

It is therefore necessary in producing a force transducer by using the Si single crystal 10 bonded to the base 20 shown in FIG. 5 to avoid the perpendicular concentration of the compression on the crystal face 10a of the Si single crystal 10 due to the small contacting area between the material for transmitting the compression and the crystal face 10a of the Si single crystal 10.

In the present invention, a seat is bonded to the crystal face 10a of the Si single crystal 10 shown in FIG. 5. The seat prevents the compression to be applied perpendicularly to the crystal face 10a of the Si single crystal 10 from concentrating on the crystal face 10a, in other words, transmits the compression to the crystal face 10a in a constantly dispersed state.

FIGS. 1A and 1B are respectively a plan view and a side elevational view of the fundamental structure of a force transducer according to the present invention composed of the Si single crystal 10 bonded to the base 20 shown in FIG. 5 and a seat 30 bonded to the Si single crystal 10 for transmitting in a dispersed state the compression W applied to the crystal face 10a of the Si single crystal 10.

In FIGS. 1A and 1B, the seat 30 has a height C of not less than the circumradius d/2 of the bonding area (the area of the bonding surface) in which the crystal face 10a and the bonding surface 30b of the seat 30 are bonded together in order to transmit the compression W applied to the top surface 30a of the seat 30 to the crystal face 10a of the Si single crystal 10 in a dispersed state.

The height C of the seat 30 enables the compression W to be dispersed sufficiently for practical use in transmitting it to the crystal face 10a of the Si single crystal 10 even when the compression W is concentrated on the top surface 30a of the seat 30 and applied perpendicularly to the crystal face 10a of the Si single crystal 10. The compression stress $\sigma_z$ generated on the Si single crystal 10 is therefore sufficiently small for the breaking stress of the Si single crystal 10.

It goes without saying that the upper limit of the height C of the seat 30 is restricted to the range which does not produce buckling due to the compression W and does not reduce the efficiency of transmitting the compression W in a dispersed state to obtain the voltage output $\Delta V$.

If the compression applied to the crystal face 10a of the Si single crystal 10 is the same, the voltage output obtained is the same regardless of the size of the bonding area of the crystal face 10a which is determined by the size of the bonding surface 30b of the seat 30.

Since the seat 30 is bonded to the Si single crystal 10, the force transducer can detect the stretching force, but since the breaking strength of the material and the bonded portion against stretching is generally greatly lowered in comparison with compression, the range of the detectable stretching force is restricted to a smaller range than the range of the detectable compression.

The operation of the force transducer shown in FIGS. 1A and 1B for producing the voltage output in correspondence with the compression applied thereto will now be explained.

The applied compression W is transmitted to the crystal face 10a having an area A of the Si single crystal 10 in a state of being dispersed by the seat 30 consisting of a material which does not have deleterious influence on the current flowing on the Si single crystal 10, preferably an insulating material, thereby generating the stress $\sigma_z$ (=W/A) on the Si single crystal 10.

If it is assumed that the Si single crystal 10 is cut such that the crystal face 10a is a rectangular plate having a distance of b between the opposing sides provided with the output electrodes 12 and 12' and a distance of a between the opposing sides provided with the input electrodes 14 and 14', and a voltage V is applied between the input electrodes 14 and 14', the voltage output $\Delta V$ represented simply by the following formula (3) on the basis of the formula (2) is taken out of the output electrodes 12 and 12'.

$$\Delta V = b/a \cdot V \cdot \pi_{63} \cdot \sigma_z \quad (3)$$

In this way, the voltage output $\Delta V$ which is proportional to the compression W is very easily obtained. If the seat 30 having the bonding surface 30b having an area of, for example, (¼) A is bonded to the crystal face 10a having an area of A, the compression stress $\sigma_z$ produced on the Si single crystal 10 is increased to 4 times, but since the area of the crystal face 10a of the Si single crystal 10 on which the compression stress is generated is actually reduced to ¼, no change is caused in the voltage output $\Delta V$ taken out of the output electrodes 12 and 12'.

It can therefore be said, if attention is paid only to the breaking of the Si single crystal while disregarding the easiness of production, that in the case of the force transducer shown in FIGS. 1A and 1B, it is preferable that the compression W is dispersed in such a manner as to be applied to the entire surface of the crystal face 10a of the Si single crystal 10 and that the seat 30 having a sufficient height C for dispersing the compression W in practical use is bonded to the crystal face 10a of the Si single crystal 10.

The effects produced by the force transducer of the present invention will now be explained.

In a conventional force transducer, a plurality of semiconductor strain gages are pasted to the strain generator by an adhesive and electrically connected to each other in such a manner as to constitute a Wheatstone bridge circuit, as described above. Since the production of such a force transducer, in particular, pasting of the plurality of semiconductor gages requires complicated and high technique, the compression type load cell produced is expensive.

In addition, the deleterious influence of the adhesive on the characteristics is inevitable, and a cheap force transducer having better characteristics and a simple structure has been demanded.

According to the force transducer of the present invention, since the compression is transmitted to the crystal face of the Si single crystal through the seat which is a material for transmitting the compression, it is possible to effectively utilize the piezoresistive effect of the Si single crystal on the compression without the deleterious influence of the adhesive on the characteristics and the influence of the strain generator on the characteristics which are inevitable in the related art, and to obtain the voltage output which is proportional to the compression.

According to the present invention, since one Si single crystal has a function of a Wheatstone bridge circuit, it is possible to replace the plurality of semiconductor strain gages in the related art by the Si single crystal, thereby producing a force transducer having a simple structure at a low cost.

In addition, the force transducer of the present invention using a Si single crystal is advantageous in that since the Si single crystal has no p-n junction region, the force transducer is capable of exhibiting sufficient performance even in a high-temperature region.

BRIEF DESCRIPTION OF THE DRAWINGS

FIG. 8 is a perspective view of a first embodiment of the present invention;

FIGS. 9A and 9B are respectively a plan view and a side elevational view of a second embodiment of the present invention;

DESCRIPTION OF THE PREFERRED EMBODIMENTS

Figure 1A:
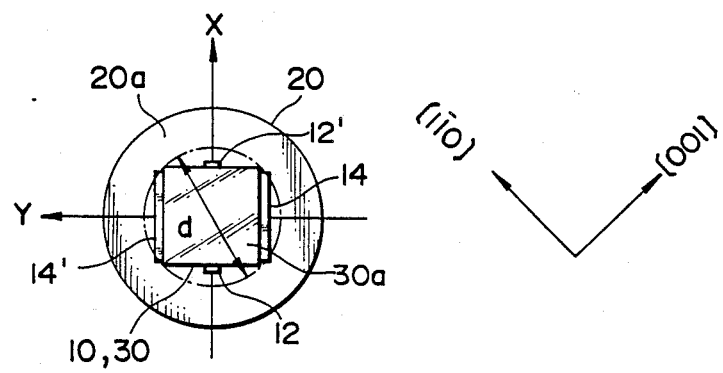
FIGS. 1A and 1B are respectively a plan view and a side elevational view of a force transducer according to the present invention, showing the fundamental structure thereof.
Figure 1B:
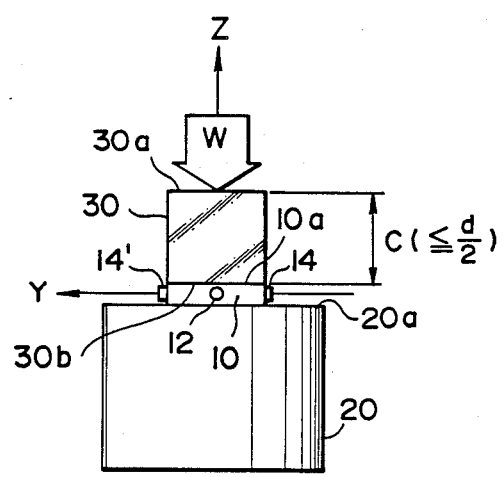
Figure 2:
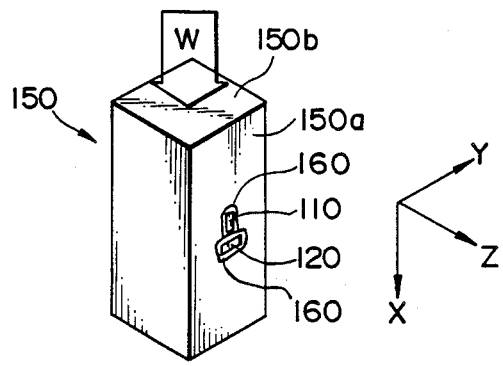
FIG. 2 is a perspective view of a conventional force transducer represented by a compression type load cell.
Figure 3:
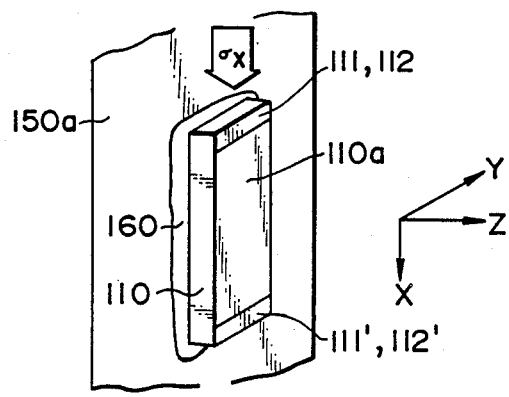
FIG. 3 is an enlarged view of a semiconductor strain gage which constitutes the conventional force transducer shown in FIG. 2.
Figure 4:
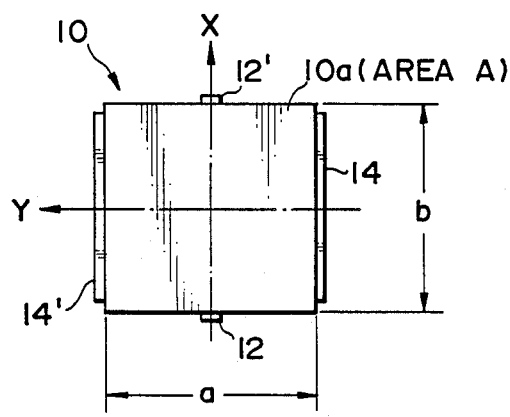
FIG. 4 is an explanatory view of Measure 1 for the present invention.

Embodiments o the present invention will be explained hereinunder.

FIG. 8 is a perspective view of a force transducer 1000 produced as a first embodiment of the present invention.

In FIG. 8, the reference numeral 10 represents a p-type Si single crystal which has a resistivity of 10 Ω-cm, an area of 1 mm$^2$, a thickness of 0.2 mm and a crystal face of (110), and which is electrostatically bonded to a base 20 consisting of crystallized glass having an area of 1 mm$^2$, a height of 1 mm and a thermal expansion coefficient which is approximate to that of the Si single crystal 10.

The reference numeral 30 represents a seat consisting of crystallized glass having an area of 1 mm$^2$, a height of 1 mm and a thermal expansion coefficient which is approximate to that of the Si single crystal 10. The seat 30 is electrostatically bonded to the Si single crystal 10 in the same way as the base 20.

The reference numeral 12 denotes an output electrode provided so as to take a voltage output out of the Si single crystal 10 by the vacuum deposition of aluminum to a width 12 w of about 0.2 mm in the direction having an angle of 45 degrees with the direction of [001]. An output electrode 12' (not shown) is provided on the opposite side of the output electrode 12 so as to constitute a pair therewith.

The reference numeral 14 represents an input electrode provided so as to apply a current to the Si single crystal 10 by the vacuum deposition of aluminum to a width 14 w of about 0.9 mm in the direction having an angle of 45 degrees with the direction of [1$\bar{1}$0]. An input electrode 14' (not shown) is provided on the opposite side of the input electrode 14 so as to constitute a pair therewith.

Figure 10:
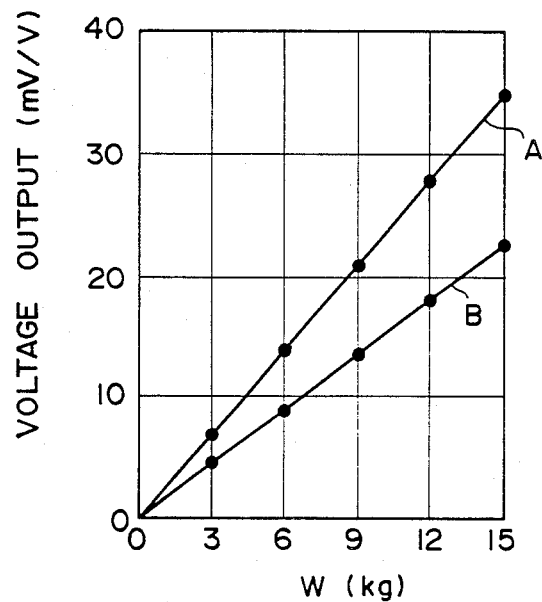
FIG. 10 shows the characteristics of the embodiments shown in FIGS. 8, 9A and 9B.

In FIG. 10, the line A shows the magnitude of the voltage output obtained when a voltage of 1 V is applied between the pair of electrodes 14 and 14' so as to cause a current to flow and the compression W of 0 to 15 kg is applied. From FIG. 10, it is clear that the force transducer 1000 of the first embodiment can obtain a linear and practical voltage output in proportion to the compression.

FIGS. 9A and 9B respectively are a plan view and a side elevational view of a force transducer 2000 produced as a second embodiment of the present invention. Unlike the first embodiment shown in FIG. 8, a pair of opposing output electrodes and a pair of opposing input electrodes are provided on the crystal face of the Si single crystal.

Figure 5:
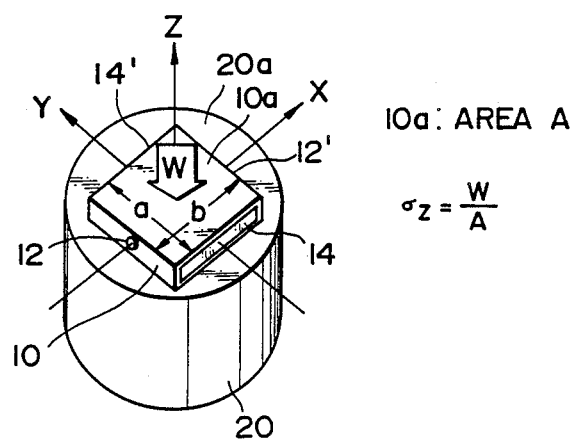
FIG. 5 is an explanatory view of the fundamental principle of the voltage output obtained by the Si single crystal which constitutes the force transducer according to the present invention.
Figure 6:
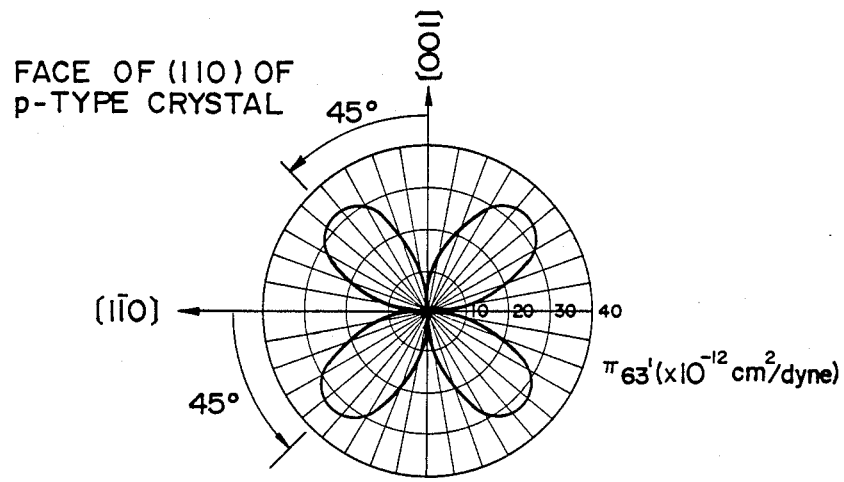
FIG. 6 shows the piezoresistive coefficient $\pi_{63'}$ of the p-type Si single crystal having a crystal face of (110)
Figure 7:
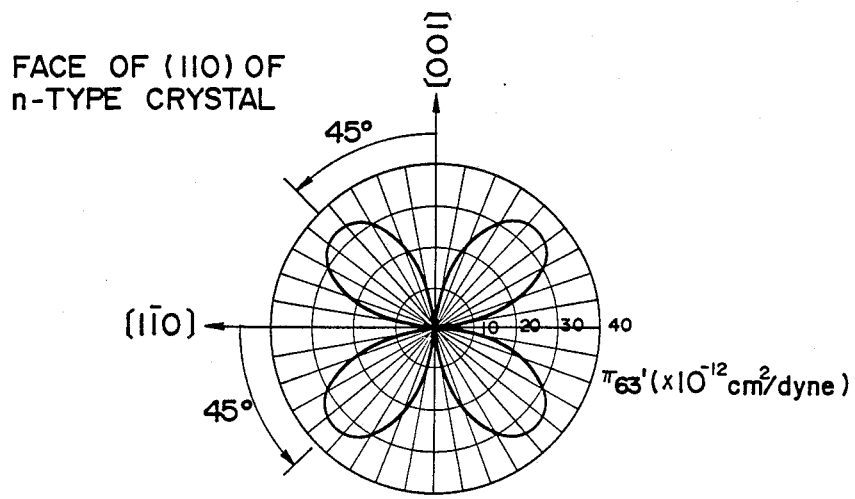
FIG. 7 shows the piezoresistive coefficient $\pi_{63'}$ of the n-type Si single crystal having a crystal face of (110)

In FIGS. 9A and 9B, the Si single crystal 10 having a crystal face 10a of 1.7 mm$^2$ wide is electrostatically bonded to the base 20 consisting of Pyrex v glass, a heat resistant glass typically composed 80% silica, 12% $B_2O_3$, addition $Na_2O$ and $Al_2O_3$, having a height of 1 mm. Although the configuration and the size of the output electrodes 12, 12' and input electrodes 14, 14' are slightly different, the Si single crystal in FIG. 9 is fundamentally the same as the Si single crystal 10 shown in FIG. 5.

The line B in FIG. 10 shows the magnitude of the voltage output obtained when a voltage of 1 V is applied between the pair of electrodes 14 and 14' so as to cause a current to flow and the compression W of 0 to 15 kg is applied. From FIG. 10, it is clear that the force transducer 2000 of the second embodiment can also obtain a linear voltage output which is similar to that of the force transducer of the first embodiment.

As has been explained in the above embodiments, a force transducer utilizing the piezoresistive effect of Si is realized by using an Si single crystal having a crystal face of (110) and provided with a pair of opposing output electrodes in the direction having an angle of 45 degrees with the direction of [001] and a pair of opposing input electrodes in the direction having an angle of 45 degrees with the direction of [1$\bar{1}$0] and a seat through which compression is applied perpendicularly to the crystal face.

The Si single crystal is electrostatically connected with the base and the seat which consist of an insulating material such as a crystallized glass in such a manner as to sandwich the Si single crystal therebetween in the pressure transducers of the first and second embodiments. However, the material of the base and the seat is not restricted to an insulating material and the Si single crystal may be bonded to the base and the seat by a method other than electrostatic bonding, so long as the base supports the Si single crystal securely so that no deleterious influence of the stress except the compression stress acts on the Si single crystal and the seat transmits the compression to be detected to the Si single crystal with certainty.

Although both output electrodes and input electrodes constituting the transducer are a pair of opposing electrodes in these embodiments, they are not restricted thereto, and they may have another form so long as they fundamentally have a function of a Wheatstone bridge circuit, preferably they are provided in the directions which are orthogonal to each other. For example, the output electrodes may be deformed in such a manner as to adjust the offset voltage more strictly to zero, as shown in a modification in FIG. 11.

Figure 11:
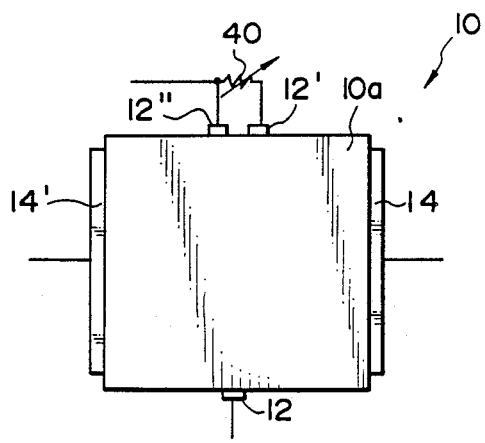
FIG. 11 shows another embodiment of a force transducer according to the present invention.

More specifically, in the modification shown in FIG. 11, an offset voltage adjusting electrode 12" is provided, and a variable resistor 40 for adjusting an offset voltage is inserted between the offset voltage adjusting electrode 12" and the output electrode 12', so that the offset voltage of the Si single crystal is adjusted more strictly to zero by adjusting the resistance of the variable resistor 40.

Alternatively, it is possible to adjust the offset voltage easily by using an external resistor, for example, by inserting an external resistor between the output electrode 12' and the input electrode 14' or between the output electrode 12' and the input electrode 14, as indicated by the broken line in FIG. 9.

In addition, if a p-type Si single crystal in which the impurity concentration is regulated to about $5 \times 10^{18}/cm^3$ or about $2 \times 10^{20}/cm^3$ is used for the Si single crystal which constitutes the force transducer of the present invention and a constant current is applied to the input electrodes thereof, what is called a self compensating force transducer in which the voltage output is always constant with respect to the temperature is realized.

Although the Si single crystal having a surface of (110) which constitutes a force transducer of the present invention is cut from an Si wafer in these embodiments, the present invention is not restricted thereto and substantially the same effect is also obtained by, for example, utilizing an Si layer which is formed by the epitaxial growth of an insulating substrate or the like.

Although the force transducer is formed by using the Si single crystal having a crystal face of (110) in these embodiments, the present invention is not restricted thereto, and the force transducer may be formed by using the Si single crystal having a crystal face equivalent to the face of (110) as shown in Table 1.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A force transducer comprising:
    an Si single crystal so formed as to have a crystal face of {110} as the surface to which compression is applied;
    a plurality of electrodes which consist of a first pair of opposing electrodes provided on said Si single crystal in the direction having an angle of 45 degrees with the direction of <001> of said Si single crystal and a second pair of opposing electrodes provided on said Si single crystal in the direction having an angle of 45 degrees with the direction of <110> of the Si single crystal, either of the first or second pair of electrodes being output electrodes and the other pair being input electrodes;
    a seat which is bonded to the crystal face of {110} of said Si single crystal and which transmits said compression substantially uniformly to said crystal face; and
    a base which is bonded to the surface of said Si single crystal opposite to the surface bonded with said seat and which supports said Si single crystal.

2. A force transducer according to claim 1, wherein said Si single crystal is so formed as to have a crystal face of (110) as the surface to which said compression is applied;
    said first pair of opposing electrodes are provided on said Si single crystal in the direction having an angle of 45 degrees with the direction of [001] of said Si single crystal and said second pair of opposing electrodes are provided on said Si single crystal in the direction having an angle of 45 degrees with the direction of [110] of the Si single crystal; and
    said seat is connected to the crystal face of (110) of said Si single crystal.

3. A force transducer according to claim 2, wherein said Si single crystal has uniform thickness and impurity concentration and has a rectangular crystal face;
    both of said output electrodes and input electrodes are disposed on said Si single crystal substantially symmetrically with respect to a plane so that the resistances between the adjacent electrodes are the same;
    said seat is composed of an insulating material having a thermal expansion coefficient which is approximate to that of said Si single crystal and is so designed as to satisfy the following condition:

$$C \geq d/2$$

wherein C represents the height of said seat and d/2 the circumradius of the bonding area between said seat and said crystal face of said Si single crystal, so that the compression applied to the top surface of said seat is dispersed substantially uniformly and transmitted perpendicularly to the crystal face of said Si single crystal; and
    said base is composed of an insulating material having a thermal expansion coefficient which is approximate to that of said Si single crystal.

4. A force transducer according to claim 1, wherein either of said first and second pair of electrodes is disposed on a side surface of said Si single crystal.

5. A force transducer according to claim 1, wherein either of said first and second pair of electrodes is disposed on the crystal face of {110} of said Si single crystal.

6. A force transducer according to claim 1, wherein said Si single crystal has uniform thickness and impurity concentration and has a rectangular crystal face; and
    both of said output electrodes and input electrodes are disposed on said Si single crystal substantially symmetrically with respect to a plane so that the resistances between the adjacent electrodes are the same.

7. A force transducer according to claim 1, wherein said seat and said base are electrostatically bonded to said Si single crystal.

8. A force transducer according to claim 1, wherein said seat is so designed as to satisfy the following condition:

$$C \geq d/2$$

wherein C represents the height of said seat and d/2 the circumradius of the bonding area between said seat and said crystal face of said Si single crystal, so that the compression applied to the top surface of said seat is dispersed substantially uniformly and transmitted perpendicularly to the crystal face of said Si single crystal.

9. A force transducer according to claim 1, wherein said seat is composed of an insulating material having a thermal expansion coefficient which is approximate to that of said Si single crystal.

10. A force transducer according to claim 9, wherein said seat is composed of crystallized glass.

11. A force transducer according to claim 1, wherein said base is composed of an insulating material having a thermal expansion coefficient which is approximate to that of said Si single crystal.

12. A force transducer according to claim 12, wherein said base is composed of heat-resistant glass.

13. A force transducer according to claim 11, wherein said base is composed of crystallized glass.

14. A force transducer according to claim 1, wherein said output electrodes and input electrodes are formed by the vacuum deposition of aluminum.

15. A force transducer according to claim 1, wherein said Si single crystal is provided with an offset voltage adjusting electrode, and a variable resistor is provided between said offset voltage adjusting electrode and one of said output electrodes, so that the offset voltage of said Si single crystal is regulated to zero by adjusting the resistance of said resistor.

16. A force transducer according to claim 1, wherein a variable resistor is provided between one of said output electrodes and one of said input electrodes, so that the offset voltage of said Si single crystal is regulated to zero by adjusting the resistance of said resistor.

17. A force transducer according to claim 1, wherein said Si single crystal is composed of a p-type Si single crystal in which the impurity concentration is adjusted to about $5 \times 10^{18}/cm^3$ or about $2 \times 10^{20}/cm^3$, and the voltage output thereof is constant with respect to the temperature.

18. A force transducer according to claim 1, said Si single crystal is composed of an Si layer formed by the epitaxial growth of an insulating substrate.

* * * * *

UNITED STATES PATENT AND TRADEMARK OFFICE
CERTIFICATE OF CORRECTION

PATENT NO. : 4,833,929

DATED : May 30, 1989

INVENTOR(S) : Yoshiteru OMURA, et al

It is certified that error appears in the above-identified patent and that said Letters Patent is hereby corrected as shown below:

In column 12, line 7, change "[110]" to --[$1\bar{1}0$]--;

In column 13, line 9, change "claim 12" to --claim 11--.

Signed and Sealed this

Seventh Day of August, 1990

Attest:

HARRY F. MANBECK, JR.

Attesting Officer

Commissioner of Patents and Trademarks